US 9,961,328 B2

(12) United States Patent
Wu et al.

(10) Patent No.: US 9,961,328 B2
(45) Date of Patent: May 1, 2018

(54) METHOD OF AND APPARATUS FOR OPTICALLY DETERMINING POSITIONS AND ORIENTATIONS OF MIRRORS

(71) Applicant: Max-Planck-Gesellschaft zur Foerderung der Wissenschaften e.V., Munich (DE)

(72) Inventors: Huixuan Wu, Lawrence, KS (US); Haitao Xu, Goettingen (DE); Eberhard Bodenschatz, Goettingen (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 219 days.

(21) Appl. No.: 14/918,723

(22) Filed: Oct. 21, 2015

(65) Prior Publication Data

US 2016/0119612 A1 Apr. 28, 2016

(30) Foreign Application Priority Data

Oct. 27, 2014 (EP) .................................. 14190437

(51) Int. Cl.
*H04N 13/00* (2018.01)
*H04N 13/02* (2006.01)
(Continued)

(52) U.S. Cl.
CPC ....... *H04N 13/0246* (2013.01); *G01B 11/002* (2013.01); *G06T 7/70* (2017.01);
(Continued)

(58) Field of Classification Search
CPC ........... H04N 13/0246; H04N 13/0239; H04N 17/002; H04N 2213/001; G06T 7/80; G06T 7/70; G01B 11/002
See application file for complete search history.

(56) References Cited

U.S. PATENT DOCUMENTS 4,385,830 A   5/1983   Webb et al.
4,664,513 A * 5/1987   Webb ........................ G01P 5/26
                                                        356/28

FOREIGN PATENT DOCUMENTS

EP    1 220 596 A1    7/2002
WO    00/62012 A1    10/2000

OTHER PUBLICATIONS

Wu et al. ("Direct vorticity measurement in turbulence", Proceedings of the 14th European Turbulence Conference, vol. 1-4, Sep. 1, 2013 (Sep. 1, 2013), XP002738264).*

(Continued)

*Primary Examiner* — Christopher S Kelley
*Assistant Examiner* — Maria Vazquez Colon
(74) *Attorney, Agent, or Firm* — Thomas | Horstemeyer LLP

(57) ABSTRACT

For determining positions and orientations of mirrors, the mirrors are illuminated with parallel light rays. A first camera is arranged in an image plane onto which an objective images the mirrors. A second camera is arranged in a focal plane of the objective, and a third camera is arranged in an intermediate plane located at distances to both the image and the focal plane. At a same point in time, a first, a second and a third picture are taken with the first, the second and the third camera, respectively. The positions and the orientations of the mirrors are determined from light spots in the first and the second picture, respectively; and which of the orientations belongs to which of the positions is determined by correlating light spots in the third picture with both the light spots in the first and in the second picture.

14 Claims, 2 Drawing Sheets

(51) Int. Cl.
*H04N 17/00* (2006.01)
*G01B 11/00* (2006.01)
*G06T 7/80* (2017.01)
*G06T 7/70* (2017.01)

(52) U.S. Cl.
CPC ........... *G06T 7/80* (2017.01); *H04N 13/0239* (2013.01); *H04N 17/002* (2013.01); *H04N 2213/001* (2013.01)

(56) References Cited

OTHER PUBLICATIONS

Huixuan Wu, Haitao Xu, Eberhard Bodenschatz: "Direct vorticity measurement in turbulence" (in the application text referred to as: "Direct optical vorticity probing"), Proceedings of the 14th European Turbulence Conference, Sep. 1-4, 2013.

* cited by examiner

METHOD OF AND APPARATUS FOR OPTICALLY DETERMINING POSITIONS AND ORIENTATIONS OF MIRRORS

CROSS REFERENCE

This present invention claims priority to European Patent Application EP 14 190 437.5, filed on Oct. 27, 2014, entitled "Method of and Apparatus for Optically Determining Positions and Orientations of Mirrors".

FIELD

The invention relates to a method of optically determining positions and orientations of a plurality of mirrors in a field of view of an objective. Further, the invention relates to an apparatus for optically determining positions and orientations of a plurality of mirrors according to the method.

BACKGROUND

In a conference talk on "Direct optical vorticity probing", 14$^{th}$ European Turbulence Conference, Sep. 1-4, 2013, Lyon, France, the inventors disclosed micro spheres of 70 µm diameter on average as particles for seeding a fluid flow to trace the motion of the fluid flow in two translational and three rotational directions. The micro spheres are illuminated by a collimated laser. The reflections from the mirrors within the micro spheres are registered by two cameras. The first camera tracks the translational motions of the mirrors. The second camera arranged in the focal plane of an objective registers the directions of the reflections from the mirrors independent from their positions. Thus, the mirror normal directions can be obtained from positions of light spots on the second camera. If the second camera is calibrated, a one-to-one mapping between pixel positions and mirror orientations can be obtained. The calibration is done using an array of mirrors whose orientations are known. When more than three successive normal directions of one mirror are known, a rotation rate of the mirror may be deduced.

The position of a small object in a field of view of an objective can be determined from the position of a light spot on a camera arranged in an image plane onto which the object is imaged by the objective. With only one objective and one camera, the position of the object can only be determined in the two spatial dimensions orthogonal to the optical axis of the objective. A further camera arranged in a further image plane onto which the object is imaged by a further objective whose optical axis points to the field of view in another direction than the optical axis of the first objective, i.e. a stereographic camera arrangement, allows for determining the position of the object in all three spatial dimensions.

It is known to provide an objective having a large aperture by means of a concave mirror arranged close to the field of view of the objective.

There still is a need of a method of and an apparatus for optically determining positions and orientations of mirrors in which the orientations of a plurality of mirrors in a field of view of an objective determined by means of a camera arranged in the focal plane of the objective can be assigned to the positions of these mirrors determined with another camera arranged in an image plane onto which the objective images the field of view, so that a plurality of images taken with both cameras, for example, allows for spatially resolved determining the vorticity of a fluid flow within or through the field of view seeded with the mirrors or deformations of a surface to which the mirrors are attached, or inside a transparent body in which the mirrors are embedded.

SUMMARY

The present invention relates to a method of optically determining positions and orientations of a plurality of mirrors in a field of view of an objective. The method comprises illuminating the field of view with parallel light rays; and arranging a first camera in an image plane onto which the objective images the field of view. The method further comprises arranging a second camera in a focal plane of the objective; and taking a first picture with the first camera and a second picture with the second camera at a same point in time. Additionally, the method comprises arranging a third camera in an intermediate plane located at distances to both the image plane and the focal plane of the objective; and taking a third picture with the third camera at the same point in time as the first and second pictures are taken with the first and second cameras Further, the present invention relates to an apparatus for optically determining positions and orientations of a plurality of mirrors according to the method of the invention. The apparatus comprises an objective having a field of view; a first camera arranged in an image plane onto which the objective images the field of view; a second camera arranged in a focal plane of the objective; and a third camera arranged in an intermediate plane located at distances to both the image plane and the focal plane of the objective.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
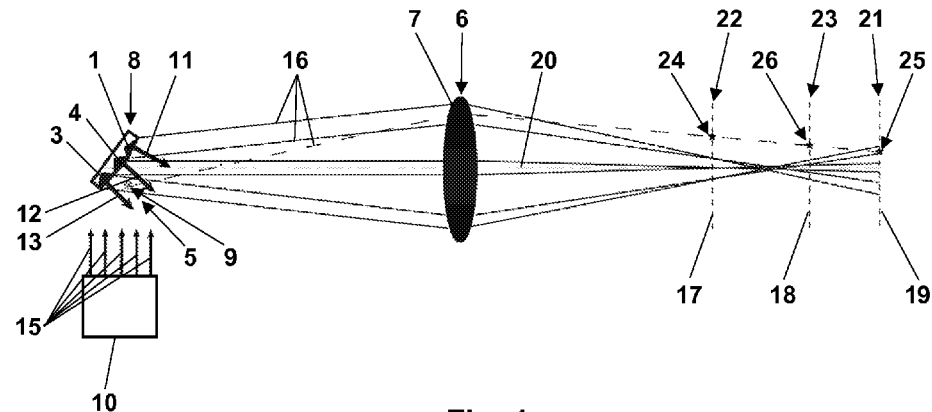
FIG. 1 shows a first embodiment of the apparatus according to the present invention for optically determining 2D-positions and orientations of a plurality of mirrors in a field of view of an objective.

In a method of optically determining positions and orientations of a plurality of mirrors in a field of view of an objective according to the present invention, the field of view is illuminated with parallel light rays. A first camera is arranged in an image plane onto which the objective images the field of view. A second camera is arranged in a focal plane of the objective; and a third camera is arranged in an intermediate plane located at a distance to both the image plane and the focal plane of the objective. At a same point in time, a first picture is taken with the first camera, a second picture is taken with the second camera, and a third picture is taken with the third camera. The light intensity distribution of the picture taken with the first camera essentially or even completely depends on the positions of the mirrors in the field of view reflecting the parallel light rays onto the camera. The light intensity distribution of the image taken with the second camera essentially or even completely depends on the direction of the parallel or almost-no-divergence light rays reflected by the mirrors, i.e. of the orientations of the mirrors in the field of view. Thus, the first picture and the second picture taken with the first and second cameras do not allow for determining from which position of the field of view the light rays have been reflected in a certain direction registered with the second camera. Consequently, any vorticity determined from a plurality of subsequently taken second pictures cannot yet be allocated to a position within the field of view. Similarly, changes in orientation of surface segments of a deformed surface or of volume elements of a deformed body in the field of view can not be associated with the positions of the surface or volume elements.

In the method of the present invention, the third camera which is arranged in the intermediate plane located at distances to both the image plane and the focal plane of the objective takes a third picture whose light intensity distribution is a function of both the position and the orientation of the mirrors in the field of view. Thus, the third picture taken at the same time as the first and second pictures taken with the first and second cameras may be correlated to both the first and the second pictures. This particularly means that a light spot due to light rays reflected from one mirror in the field of view in the third picture may be both correlated to a light spot in the first picture indicating the position of the mirror in the field of view and to a light spot in the second picture indicating the orientation of the mirror in the field of view. As a result, the light spot in the third picture connects each individual light spot in the first picture to an individual light spot in the second pictures, and thus the position and the orientation of each mirror in the field of view. Particularly, each light spot in the third picture is usually located at an intermediate position between the positions of the light spots in the first and second pictures belonging to the same mirror in the field of view.

The plurality of mirrors in the field of view of the objective may particularly be mirrors tracing the motion of a fluid flow within or passing through the field of view. The changing positions of the mirrors will then indicate the motion of the fluid flow in translational directions, and the changing orientations of the mirrors will indicate the motion of the fluid flow in rotational directions, which characterize its vorticity.

The plurality of mirrors in the field of view of the objective may also be mirrors tracing deformations of a surface or inside a transparent body.

The term "mirror" as used in this description includes any essentially flat object reflecting incident light rays in a defined direction depending on the orientation of the essentially flat object. This definition, besides ordinary mirrors, also encompasses gratings, for example.

If, under certain circumstances, it proves to be difficult to correlate the positions of the light spots in the third picture to both the positions of the light spots in the first and second pictures, a further camera may be arranged in a further intermediate plane located at other distances to both the image plane and the focal plane of the objective, and the third camera and the further camera may be arranged at about equivalent distances with regard to each other and with regard to the first and second cameras along the optical axis of the objective. Then, the shifts between the light spots belonging to a same mirror in each pair of pictures taken with two cameras following each other along the optical axis of the objective will be smaller, and thus the individual light spots in the different pictures may more easily be correlated to each other. In a similar way, an even further camera may be arranged and used according to the present invention.

As already indicated above, the method according to the present invention will include that the positions of the mirrors in the field of view are determined from positions of the light spots in the first picture, whereas the orientations of the mirrors in the field of view are determined from positions of the light spots in the second picture. Which of the orientations belongs to which of the positions of the mirrors in the field of view is additionally determined by correlating positions of light spots in the third picture with both the light spots in the first picture and the light spots in the second picture.

That the first, second and third pictures are taken at the same point in time does not necessarily mean that these pictures are taken simultaneously. Their exposure times do not even need to overlap. In fact, it is sufficient for fulfilling the feature that the pictures are taken at the same point in time that the positions and orientations of the mirrors in the field of view remain essentially the same when the various pictures are taken. If, however, the mirrors in the field of view move, i.e. change their positions and/or orientations, the first, second and third pictures should be essentially taken simultaneously so that they depict the mirrors in essentially identical positions and with essentially identical orientations.

If the mirrors are moving in or through the field of view, the method of the present invention may include that the first, second and third pictures are repeatedly taken at subsequent points in time, and that changes in position and orientation of individual mirrors in the field of view are tracked. This tracking will include correlating light spots in the first and/or second and/or third pictures taken at the subsequent points in time.

The method of the present invention may be particularly used to determine the positions and orientations of mirrors which are tracing the motion of a fluid flow within or passing through the field of view. These mirrors may be embedded or integrated in particles, and the fluid flow may be seeded with the particles for tracing the motion of the fluid flow. If the particles are spheres having a diameter in a range from 10 to 1000 µm, preferably in a range of 20 to 70 µm, they will follow a fluid flow when the fluid is a liquid, even if the liquid has a low viscosity. Given that the densities of the particles and the liquid can be adjusted to be the same or to be different, the mirrors can demonstrate fluid dynamics or particle dynamics under the influence of the liquid. Particles at the lower end of these diameter ranges may even be used to seed a gas flow for tracing its motion. Due to the small size of the mirrors, the light spots due to reflected light rays in the first and third picture will only be small despite the fact that the reflected parallel light beams will neither be focused onto the image plane nor the intermediate plane but only in the focal plane of the objective. However, the light spots in the first and third picture simply represent the size of the mirrors, and the method of the present invention is working even with larger mirrors as long as the mirrors are not essentially overlapping in the field of view of the objective, and as long as the light spots in the third picture may be unambiguously correlated to both the light spots in the first and second pictures. With small mirrors, the number of mirrors in the field of view may be quite high, i.e. some tens.

The method of the present invention may be particularly used to determine the positions and orientations of mirrors which are attached to a surface or embedded in a transparent, i.e. in an optically accessible body, and to track deformations of the surface or the body in the field of view.

Using one objective and first, second and third cameras arranged perpendicular to and along the optical axis of this objective is only sufficient for determining the spatial positions of the mirrors in the two translational directions perpendicular to the optical axis, even though the mirrors are distributed in three-dimensional space. If, however, all the three components of the spatial positions of the mirrors are required, a further objective and a fourth camera arranged in an image plane of the further objective, i.e. in a plane onto which the further objective images the field of view, is needed to provide a stereographic camera setup by which the positions of the mirrors can be determined in all three spatial dimensions. Simply providing a further objective and a fourth camera in the image plane of the further objective, however, is not sufficient in the method of the present invention to resolve the positions of the mirrors in the field of view in all three spatial dimensions. This is due to the fact that the field of view is illuminated by parallel light rays, and that, if the parallel light rays reflected by some mirrors are collected by the objective in whose focal plane the third camera is arranged, they will not reach the further objective. Consequently, the first camera and the fourth camera will never both register parallel light rays reflected by the same mirrors as these light rays are reflected in one direction only. Thus, a stereographic camera arrangement according to the present invention also involves illuminating the field of view with further parallel light rays, the further parallel light rays coming out of another direction than the parallel light rays whose reflections are collected with the objective. Additionally, the further parallel light rays have to be distinguishable from the parallel light rays. This allows to block the reflected further parallel light rays from the first, second and third cameras, and to block the reflected light rays from the fourth camera. A fourth picture taken with the fourth camera at the same point in time as the first, second and third pictures are taken with the first, second and third cameras thus only includes light spots due to reflected further parallel light rays. Preferably, solid angles between the parallel light rays and the optical axis of the objective, on the one hand, and between the further parallel light rays and the optical axis of the further objective, on the other hand, are adjusted in an appropriate way and if both objectives have the same effective aperture, the first and fourth pictures taken with the first and fourth cameras will essentially depict light spots due to light rays and further light rays reflected by the same mirrors in the field of view. The second and third pictures taken with the second and third cameras will always depict the light rays reflected by the same mirrors in the field of view as those depicted in the first picture.

The parallel light rays and the further parallel light rays may particularly differ in their wavelengths, they may additionally or alternatively also differ in their polarization. They may also differ in the instance in time at which they are applied to illuminate the field of view. For example, the light rays and the further light rays may be intermittently emitted by pulsed light sources, and the first, second and third cameras may be synchronized with the pulsed light source emitting the light rays, whereas the fourth camera is synchronized with the further pulsed light source emitting the further light rays. If the pulse rate is high as compared to the characteristic time scale at which the mirrors move in the field of view, the fourth picture may still sufficiently be taken at the same point in time as the first, second and third picture, because the fourth picture will then still show the mirrors in essentially the same positions as in the first picture.

In the method of the present invention, the objective, and, if provided, the further objective, may each comprise one or more lenses. They may alternatively or additionally also comprise mirrors, particularly at least one concave mirror. Such a concave mirror may be arranged close to the field of view to provide an objective of a particularly high effective aperture collecting light rays reflected into a large range of solid angles.

The apparatus according to the present invention for optically determining positions and orientations of a plurality of mirrors according to the method of the present invention comprises an objective having a field of view, a first camera arranged in an image plane onto which the objective images the field of view, a second camera arranged in a focal plane of the objective, and a third camera arranged in an intermediate plane located at distances to both the image plane and the focal plane of the objective.

This optical arrangement may be supplemented by any light source illuminating the field of view with parallel light rays. A 3D-variant of the apparatus of the present invention additionally comprises a further light source illuminating the field of view with further parallel light rays, the further parallel light rays coming out of another direction than the parallel light rays and being distinguishable from the parallel light rays, a blocking device blocking the reflected further parallel light rays from the first, second and third cameras, a second objective imaging the field of view onto a fourth camera arranged in an image plane of the further objective, i.e. in a plane onto which the further objective images the field of view, and a further blocking device blocking the reflected parallel light rays from the fourth camera.

In the 3D-variant of the apparatus of the present invention, the solid angles between the parallel light rays and an optical axis of the objective and between the further parallel light rays and an optical axis of the further objective should be adjusted in such a way that any mirror in the field of view which reflects parallel light rays from the light source into the objective reflects further parallel light rays from the further light source into the second objective.

A synchronization device will typically be provided for synchronizing all cameras so that they take pictures at the same points in time, i.e. pictures depicting the mirrors in the field of view in same positions and orientations. Such a synchronization device will particularly be used if all cameras are repeatedly taking pictures of mirrors moving within or through the field of view. In this case, each set of pictures taken by the various cameras should essentially be taken simultaneously.

The objective, and, if provided, the further objective, may include a concave mirror.

The term "camera" so far as used here in defining the present invention essentially means an image sensor or a two-dimensional light sensor array, like for example a CCD or CMOS chip. This image sensor will be arranged in the respective plane indicated for the respective camera.

Even if not mentioned here, half transparent mirrors will typically be arranged both between the second and the third and between the third and the first camera so that the reflected light rays may in part proceed up to all cameras arranged along the optical axis of the objective.

Both the relation between the position of a mirror in the field of view and the position of its image in the picture taken with the first or fourth camera, and the relation between the orientation of the mirror and the position of the light spot in the third picture due to the parallel light rays reflected by the mirror may be determined by placing one or more mirrors with known positions and orientations into the field of view and/or by changing the positions and/or orientations of these mirrors in a defined way. In other words, using such mirrors of known positions and/or orientations, the camera of the apparatus of to the present invention may be calibrated.

Now referring in greater detail to the drawings, FIG. 1 shows an apparatus for optically determining the positions and orientations of mirrors 1 to 4 located in a field of view 5 of an objective 6. The objective 6 is represented by a single lens 7 here. It may, however, comprise more than one lens and it may also include curved mirrors, not depicted here. The mirrors 1 to 3 in the field of view are parts of a mirror array 8 arranged in the field of view 5 to calibrate the apparatus depicted in FIG. 1. These mirrors 1 to 3 have known positions and orientations, their orientations being indicated by their normal vectors 11, 12 and 13 here. The mirror 4 in the field of view 5 may be integrated in a probing particle 9 which may be used to trace a fluid flow within or through the field of view 5, for example. Alternatively, the mirror 4 may be attached to a surface (not depicted here) for tracing deformations of the surface in the field of view. The mirrors 1 to 4 in the field of view 5 are illuminated by a light source 10 providing parallel light rays 15. The parallel light rays 15 incident on the mirrors 1 to 4 are reflected by the mirrors 1 to 4. If the orientations of the mirrors 1 to 4 are within a certain range, the reflected light rays 16 get into the objective 6, i.e. into its aperture not separately indicated here. The reflected light rays 16 are detected by three different cameras 17 to 19 arranged along the optical axis 20 of the objective 6. The camera 19, which in this description is also referred to as the first camera although it may, as depicted in FIG. 1, be the camera farthest away from the field of view 5, is arranged in an image plane 21 onto which the objective 6 images the field of view 5. The camera 17, which is also referred to as the second camera here although it may, as depicted in FIG. 1, be the camera closest to the objective 6, is arranged in a focal plane 22 of the objective 6. The camera 18, also referred to as the third camera here, is arranged in an intermediate plane 23 at distances to both the image plane 21 and the focal plane 22. Here, in the embodiment depicted in FIG. 1 the intermediate plane 23 is located between the image plane 21 and the focal plane 22. It may, however also be located in front of the camera 17 or behind the camera 19, where optically equivalent locations exist. The light rays 16 reflected by each of the mirrors 1 to 4 are still parallel light rays, and they will be focused by the objective 6 into a single light spot within the focal plane 22. The position of this light spot will only be dependent on the direction of the reflected light rays 16, i.e. on the orientation of the respective mirror 1 to 4. The light spot 24 is the light spot formed by the light rays 16 reflected by the mirror 4 and depicted with a dashed line, and indicates the orientation of the mirror 4. A light spot 25 in the image plane 21 due to the same light rays 16 reflected by the mirror 4 indicates the position of the mirror 4 in the field of view. Whereas the position of the light spot 24 in the focal plane 22 is only dependent on the orientation of the mirror 4 but not on its position in the field of view 5, the light spot 25 in the image plane is only dependent on the position of the mirror 4 in the field of view 5 but not on its orientation. As the orientation and the position of the mirror 4 are independent characteristics of the mirror 4, pictures taken with the cameras 17 and 19 are not correlated and do not allow to determine which light spot 24 belongs to which light spot 25, particularly if there is a plurality of mirrors 4 included in probing particles 9 in the field of view 5. In a picture taken with the third camera 18, however, the position of a light spot 26 formed by the light rays 16 reflected by the mirror 4, however, is both dependent on the orientation and the position of the mirror 4 in the field of view 5. Thus, even with a large number of mirrors 4 in the field of view 5, this picture may be both correlated to the picture taken with the camera 17 and the picture taken with the camera 19 in such a way that it can be told which light spot 26 belongs to which light spot 24 and to which light spot 25. The result of this determination is the desired knowledge of which light spot 24 belongs to which light spot 25, i.e. which orientation belongs to which mirror at which position. The apparatus depicted in FIG. 1 is particularly suited for tracking the motion of one or more probing particles 9 both in translational and rotational directions. To this end, the cameras 17 to 19 are used to take sets of pictures at consecutive points in time. The pictures of each set of pictures taken with the cameras 17 to 19 are in each case essentially taken at one point in time so that they depict the mirrors 1 to 4 in the same positions and orientations within the field of view 5. Between consecutive pictures taken with each camera, the movement of the particles 9 within the field of view 5 may be tracked, and this tracking may be based on information from all pictures taken. This means that the tracking should result in consistent tracks for each probing particle 9 both in translational and rotational directions. For completely calibrating the apparatus depicted in FIG. 1, the mirror array 8 may be placed at different positions within the field of view 5 and tilted to different angles so that the normal vectors 13 of the mirrors 1 to 3 point in different known directions.

Figure 2:
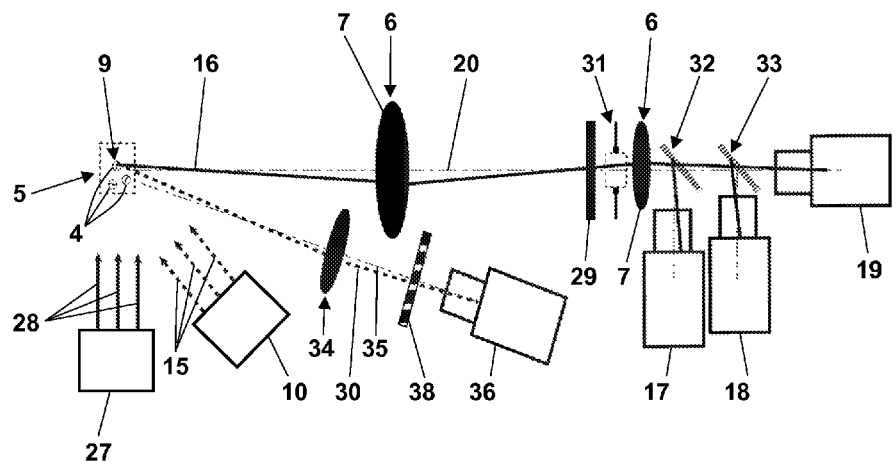
FIG. 2 shows another embodiment of an apparatus according to the present invention for determining 3D-positions and orientations of a plurality of mirrors in a field of view of an objective.

Whereas the apparatus depicted in FIG. 1 is only suitable for determining the 2D-position of the mirrors 1 to 4 in the field of view 5, FIG. 2 depicts an apparatus allowing for determination of the 3D-position of mirrors 4 in the field of view 5. The mirrors 4 depicted in FIG. 2 are once again embedded in probing particles 9. The field of view 5 is illuminated by the light source 10 with the parallel light beams 15 and by a further light source 27 with further parallel light rays 28. The further parallel light rays 28 are distinguishable from the light rays 15, for example by their wavelength, i.e. color. The objective 6 is only used to register the reflected light rays 16, which are the light rays 15 reflected by the mirrors 4 in the field of view 5. A color filter 29 arranged between the lenses 7 of the objective, blocks reflected light rays 30, which are the light rays 28 reflected by the mirrors 4 in the field of view 5 and thus have the same wavelength as the light rays 28. Despite the fact that the objective 6 is depicted with two lenses 7 here, and its aperture 31 as well as half transparent mirrors 32 and 33 between the cameras 17 to 19 are indicated, the optical setup of the objective 6 and the cameras 17 to 19 corresponds to FIG. 1, i.e. camera 17 is arranged in the focal plane of the objective 6, camera 19 is arranged in the image plane of the objective 6 and camera 18 is arranged in an intermediate plane. The further reflected light rays 30 are registered with a further objective 34 whose optical axis 35 points towards the field of view 5 in another direction than the optical axis 20 of the objective 6. A fourth camera 36 is arranged in an image plane onto which the objective 34, only depicted by single lens 37 here, images the field of view 5. A color filter 38 blocks the wavelength of the parallel rays 15 and the reflected rays 16 so that the camera 36 only registers the reflected light rays 30. These light rays 30 will be the light rays 28 reflected by the same mirrors 4 in the field of view 5 whose positions are also determined with the camera 19, if the effective apertures of both objectives 6 and 34 are equal and the solid angles between the parallel light rays 15 and the optical axis 20, on the one hand, and between the further light rays 28 and the optical axis 35, on the other hand, are adjusted in an appropriate way. The apparatus according to FIG. 2 is a stereographical setup for determining the positions of the mirrors 4 in the field of view 5 with the cameras 19 and 36 adapted to the fact that the objects whose 3D-positions are to be determined are mirrors illuminated with parallel light rays.

Figure 3:
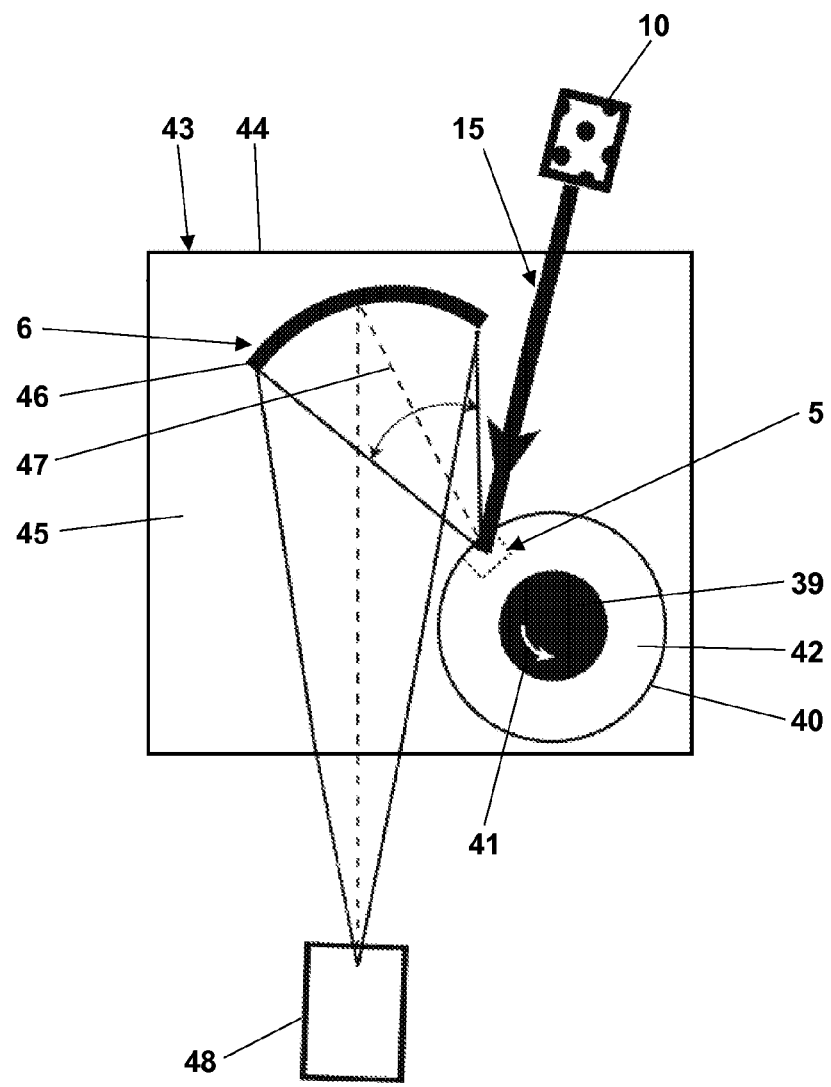
FIG. 3 shows a further embodiment of an apparatus according to the present invention for determining 2D-positions and orientations of a plurality of mirrors in a field of view of an objective integrated in an experimental setup of a Taylor Couette device.

FIG. 3 depicts an apparatus according to the present invention integrated in an experimental setup for examining a Taylor Couette flow between concentric cylinders 39 and 40. The outer cylinder 40 is stationary, whereas the inner cylinder 39 rotates as indicated by an rotating arrow 41. Above a certain rotation velocity of the inner cylinder 39 a fluid flow of a fluid 42 placed between the cylinders 39 and 40 transits to a Taylor vortex flow. For examining the motion of small volumes of this fluid flow both in translational and rotational directions, the rotational directions corresponding to the vorticity of the fluid flow, the field of view 5 is illuminated by the light source 10 with the bundle of parallel light rays 15. The light source 10 is located outside a box 43 with transparent walls 44 including a glycerol solution 45. The cylinders 39 and 40, and a concave mirror 46 forming the objective 6 or being at least part of the objective 6 here are submerged in the glycerol solution to minimize light scattering on the curved cylinder surface. The concave mirror 46 is designed and arranged close to the field of view to cover a large solid angle 47 into which the parallel light rays 25 may be reflected so that they are registered by the camera setup 48. This camera setup 48 corresponds to the setup of the cameras 17 to 19 according to FIG. 1 or 2. The camera setup 48 and the light source 10 are arranged outside the box 43.

Many variations and modifications may be made to the described embodiment of the invention without departing substantially from the spirit and principles of the invention. All such modifications and variations are intended to be included herein within the scope of the present invention, as defined by the following claims.

We claim:

1. A method of optically determining positions and orientations of a plurality of mirrors in a field of view of an objective, the method comprising:
   illuminating the field of view with parallel light rays;
   arranging a first camera in an image plane onto which the objective images the field of view;
   arranging a second camera in a focal plane of the objective;
   taking a first picture with the first camera and a second picture with the second camera at a same point in time;
   arranging a third camera in an intermediate plane located at distances to both the image plane and the focal plane of the objectives;
   taking a third picture with the third camera at the same point in time as the first and second pictures are taken with the first and second cameras;
   determining the positions of the mirrors in the field of view from positions of light spots in the first picture;
   determining the orientations of the mirrors in the field of view from positions of light spots in the second picture; and
   determining which of the orientations belongs to which of the positions of the mirrors in the field of view by correlating positions of light spots in the third picture with both the light spots in the first picture and the light spots in the second picture.

2. The method of claim 1, further comprising
   repeatedly taking the first, second and third pictures at subsequent points in time, and
   tracking changes in positions and orientations of individual mirrors in the field of view.

3. The method of claim 1, wherein the mirrors are tracing a fluid flow within or passing through the field of view.

4. The method of claim 3, further comprising
   embedding the mirrors in particles; and
   seeding the fluid flow with the particles.

5. The method of claim 4, wherein the particles are spheres having a diameter of at least 10 μm.

6. The method of claim 4, wherein the particles are spheres having a diameter in a range from 20 to 70 μm.

7. The method of claim 1, wherein the mirrors are tracing deformations of a surface or inside a transparent body in the field of view.

8. The method of claim 7, further comprising attaching the mirrors to the surface or embedding them in the transparent body.

9. The method of claim 1, further comprising
   illuminating the field of view with further parallel light rays, the further parallel light rays coming out of another direction than the parallel light rays and being distinguishable from the parallel light rays;
   blocking reflected further parallel light rays from the first, second and third cameras;
   imaging the field of view with a further objective onto a fourth camera arranged in an image plane of the further objective;
   blocking reflected parallel rays from the fourth camera; and
   taking a fourth picture with the fourth camera at the same point in time as the first, second and third pictures are taken with the first, second and third cameras.

10. The method of claim 9, further comprising determining three dimensional positions of the mirrors in the field of view from positions of light spots in the first and fourth pictures.

11. The method of claim 1, further comprising including a concave mirror in the objective.

12. An apparatus for optically determining positions and orientations of a plurality of mirrors, the apparatus comprising:
   an objective having a field of view;
   a first camera arranged in an image plane onto which the objective images the field of view;
   a second camera arranged in a focal plane of the objective;
   a third camera arranged in an intermediate plane located at distances to both the image plane and the focal plane of the objective;
   a light source illuminating the field of view with parallel light rays;
   a further light source illuminating the field of view with further parallel light rays, the further parallel light rays coming out of another direction than the parallel light rays and being distinguishable from the parallel light rays;

a blocking device blocking reflected further parallel light rays from the first, second and third cameras;

a second objective imaging the field of view onto a fourth camera arranged in an image plane of the further objective; and a further blocking device blocking reflected parallel light rays from the fourth camera.

13. The apparatus of claim 12, wherein solid angles between the parallel light rays and an optical axis of the objective and between the further parallel light rays and an optical axis of the further objective are adjusted in such a way that any mirror in the field of view which reflects parallel light rays from the light source into the objective reflects further parallel light rays from the further light source into the second objective.

14. The apparatus of claim 12, wherein the objective includes a concave mirror.

* * * * *